US009733980B1

(12) United States Patent
Khan et al.

(10) Patent No.: US 9,733,980 B1
(45) Date of Patent: Aug. 15, 2017

(54) VIRTUAL MACHINE MANAGEMENT USING I/O DEVICE LOGGING

(71) Applicant: Amazon Technologies, Inc., Seattle, WA (US)

(72) Inventors: Asif Khan, Cedar Park, TX (US); Anthony Nicholas Liguori, Bainbridge Island, WA (US); Mark Bradley Davis, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 14/562,560

(22) Filed: Dec. 5, 2014

(51) Int. Cl.
*G06F 9/455* (2006.01)
*G06F 9/48* (2006.01)
*H04L 29/06* (2006.01)

(52) U.S. Cl.
CPC ........ *G06F 9/4856* (2013.01); *G06F 9/45558* (2013.01); *H04L 67/42* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,334,178 B1 * | 2/2008 | Aulagnier | G01R 31/318342 713/160 |
| 8,799,879 B2 * | 8/2014 | Wright | G06F 9/45516 717/136 |
| 9,361,145 B1 * | 6/2016 | Wilson | G06F 9/45558 |
| 2003/0226058 A1 | 12/2003 | Miller et al. | |
| 2006/0161707 A1 | 7/2006 | Davies et al. | |
| 2008/0189720 A1 | 8/2008 | Moertl et al. | |
| 2008/0228971 A1 | 9/2008 | Rothman et al. | |
| 2014/0052808 A1 | 2/2014 | Krishnan et al. | |
| 2014/0129765 A1 | 5/2014 | Cho et al. | |
| 2014/0258570 A1 * | 9/2014 | Eide | G06F 9/4411 710/104 |

OTHER PUBLICATIONS

Clark et al. Live Migration of Virtual Machines. [online] (2005). USENIX., pp. 273-286. Retrieved From the Internet <http://seelab.ucsd.edu/virtualefficiency/related_papers/54_nsdi05.pdf>.*

(Continued)

*Primary Examiner* — Emerson Puente
*Assistant Examiner* — Jonathan R Labud
(74) *Attorney, Agent, or Firm* — Kilpatrick Townsend & Stockton LLP

(57) ABSTRACT

Techniques are described for managing virtual machines using input/output (I/O) device logging. For example, a system bus or other interface to a device may be monitored for traffic data elements. The traffic data elements may include, for example, transaction layer packets (TLPs) for communication across a PCI Express interface, or TCP/IP packets for communication over a network. These traffic data elements may be logged in an I/O device logging buffer. The I/O device logging buffer can then be used to ensure that all memory relating to a virtual machine is copied when transferring the virtual machine to another computing device. In addition, the I/O device logging buffer can be used to stop a virtual machine without waiting for the virtual machine to complete I/O processing.

18 Claims, 13 Drawing Sheets

(56) References Cited

OTHER PUBLICATIONS

Huang et al. High Performance Virtual Machine Migration with RDMA over Modern Interconnects. [online] (2007). IEEE., pp. 1-10. Retrieved From the Internet <http://ieeexplore.ieee.org/xpls/abs_all.jsp?arnumber=4629212&tag=1>.*
Cully. Remus: Hight Availability via Asynchronous Virtual Machine Replication. [online] (2008). USENIX., pp. 161-174. Retrieved From the Internet <http://citeseerx.ist.psu.edu/viewdoc/download?doi=10.1.1.143.5802&rep=rep1&type=pdf>.*
U.S. Appl. No. 14/562,556, filed Dec. 5, 2014, Titled: Systems and Methods for I/O Device Logging.

* cited by examiner

VIRTUAL MACHINE MANAGEMENT USING I/O DEVICE LOGGING

CROSS-REFERENCE TO RELATED APPLICATION

The present application is related to U.S. patent application Ser. No. 14/562,556, filed on Dec. 5, 2014, titled SYSTEMS AND METHODS FOR I/O DEVICE LOGGING, the entire content of which is hereby incorporated by reference for all purposes.

BACKGROUND

Virtual machines are an increasingly common mechanism for conducting computing tasks. Virtual machines can allow multiple guest operating systems (guest OSes) to run within a single physical machine. Running computing tasks as virtual machines can allow improved utilization of computing resources and can facilitate the transfer of computing tasks between computers.

However, transferring a running virtual machine between two servers can be challenging. For example, the virtual machine may be constantly writing to system memory (e.g., RAM), which may complicate efforts to ensure that the virtual machine's state is properly copied to the new server. Furthermore, in some cases memory associated with a virtual machine can be modified by multiple entities.

BRIEF DESCRIPTION OF THE DRAWINGS

Various embodiments in accordance with the present disclosure will be described with reference to the drawings, in which.

DETAILED DESCRIPTION

Figure 1A:
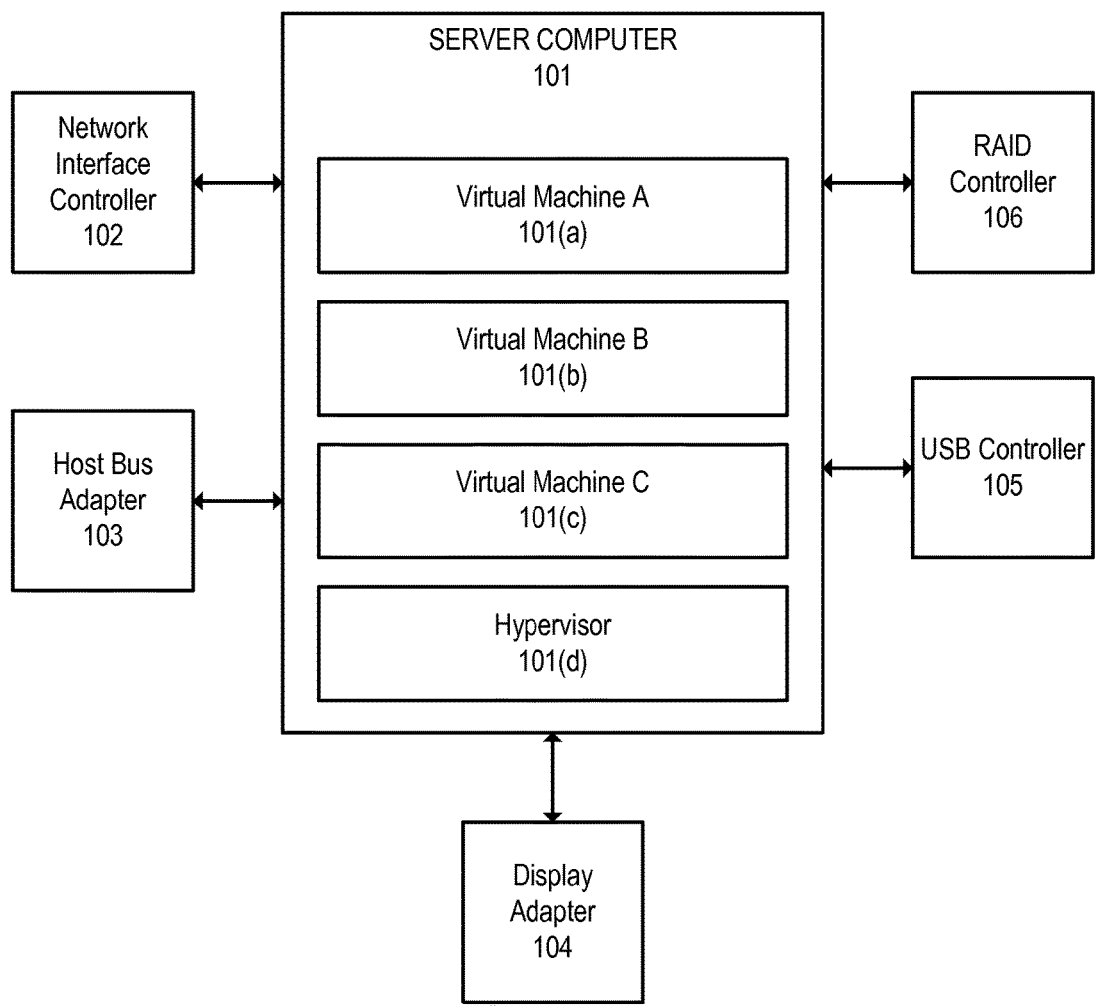
FIG. 1A shows a block diagram illustrating communication between a CPU running a plurality of virtual machines (VM) and a plurality of input/output (I/O) devices according to one embodiment of the disclosed technologies.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques are described for managing virtual machines using input/output (I/O) device logging. For example, a system bus or other interface to a device may be monitored for traffic data elements. The traffic data elements may include, for example, transaction layer packets (TLPs) for communication across a Peripheral Component Interconnect (PCI) Express interface, or Transmission Control Protocol/Internet Protocol (TCP/IP) packets for communication over a network. These traffic data elements may be logged in an I/O device logging buffer. The I/O logging device buffer can then be used to ensure that all memory relating to a virtual machine is copied when transferring the virtual machine to another computing device.

Techniques are also described for stopping a virtual machine without waiting for the virtual machine to complete I/O processing. In some cases, it may be necessary to perform processing relating to I/O devices (e.g., responding to I/O device requests) before terminating a connection with an I/O device. Rather than keeping a virtual machine running to perform such processing, a hypervisor can inspect an I/O device logging buffer to determine device requests that need to be handled. This can allow the hypervisor to halt the virtual machine even while I/O device requests are pending.

Server computers often have a need to perform tasks outside the environment of the CPU and main memory (i.e., RAM). For example, the server may need to communicate with external entities (e.g., other servers), receive data from users (e.g., using a keyboard or mouse), or process data using an external processor (e.g., a GPGPU). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets. In other cases, I/O devices may be general purpose offloading engine or otherwise configurable. For example, an offloading engine may comprise a general purpose processor and firmware that may be used to support multiple functions, such as multiple NICs and/or external processors.

I/O devices can complicate the use of virtual machines. For example, in order to migrate a virtual machine from a first server to a second server, it is typically necessary to copy all state relating to the virtual machine to the second server. This state may include, for example, the contents of main memory (e.g., RAM) associated with the virtual machine. In order to efficiently transfer a running virtual machine, a hypervisor, virtual machine monitor (VMM), or other entity carrying out the transfer may identify "dirty" pages—those containing data recently modified by the virtual machine. One method for determining that a page is dirty is through a page fault generated when the page is accessed by the virtual machine. However, in some cases, I/O devices may perform direct memory access (DMA) writes to physical memory, which may not cause page faults. Thus, the hypervisor may not have accurate knowledge of all modified pages.

In addition, communication with I/O devices may interfere with a hypervisor's ability to stop a virtual machine. A virtual machine in communication with an I/O device may have a plurality of pending traffic data. For example, the I/O device may expect acknowledgement and/or processing of a request sent to the virtual machine, and vice versa. Halting the virtual machine without properly handling this communication can cause deleterious effects such as data loss to both the I/O device and the virtual machine. However, waiting for this communication to conclude may take an indeterminate and undesirably long amount of time.

Embodiments of the disclosed technologies can address these issues by maintaining one or more I/O logging buffers that log communication associated with virtual or physical I/O devices. The I/O logging buffers may maintain buffer entries that correspond to data traffic (e.g., signals or packets) sent to and from an I/O device. For example, if an I/O device communicates via a PCI Express bus, an I/O logging buffer may store transaction layer packets (TLP) to and from the I/O device, or if the I/O device communicates via Ethernet, an I/O logging buffer may store TCP/IP packets sent via the Ethernet link.

In some embodiments, I/O logging buffers can be used to facilitate the transfer of a virtual machine from a first server computer to a second server computer. For example, in one method for transferring the virtual machine, a hypervisor performs a preliminary copy of all of the virtual machine's memory pages. Next, the hypervisor identifies any pages modified since the preliminary copy. For example, the hypervisor may mark pages that are modified by a CPU of the server computer as "dirty." The hypervisor can also inspect an I/O logging buffer for each of one or more I/O devices associated with the virtual machine to determine the memory addresses of any direct memory access (DMA) or other out of band memory write operations that were performed since the preliminary copy. The hypervisor can then perform a secondary copy of the modified memory pages and addresses to the second server computer.

In some embodiments, I/O logging buffers can be used to efficiently stop a virtual machine. For example, in one method for stopping a virtual machine, a hypervisor can inspect an I/O logging buffer to determine one or more pending traffic data elements, such as request packets. Rather than waiting for the virtual machine to respond to each of these packets, embodiments can halt the virtual machine and process the packets at the hypervisor. Therefore, embodiments can allow for quickly stopping a virtual machine while still maintaining an I/O protocol (i.e., providing a response to pending requests), thus providing a "graceful exit" for the virtual machine and avoiding complications such as data loss and errors at the I/O device.

I. Systems

FIG. 1 shows a block diagram illustrating communication between a server computer 101 and a plurality of input/output (I/O) devices 102-106 according to one embodiment. As shown in FIG. 1, server computer 101 runs a plurality of virtual machines 101(a)-101(c). The virtual machines may be managed by a hypervisor 101(d). In various embodiments, the I/O devices may be a part of server computer 101, or they may be external to server computer 101.

Virtual machines 101(a)-(c) may communicate with each of devices 102-106 using any suitable protocol. For example, the virtual machines 101(a)-(c) may communicate with a network interface card 102 by sending and receiving Ethernet packets, transmission control protocol/internet protocol (TCP/IP) packets, or user datagram protocol (UDP) packets to the network interface card 102. If a host bus adapter 103 is a Fibre Channel adapter, virtual machines 101(a)-(c) may communicate with host bus adapter 103 by sending and receiving link control frames. Virtual machines 101(a)-(c) may also communicate with a display adapter 103 (e.g., a graphics card), such as via transaction layer packets (TLP) sent and received via a PCI Express bus. Similarly, virtual machines 101(a)-(c) may communicate with USB controller 105 via a USB bus, and RAID controller 106 via a SATA bus, for example.

In some embodiments, I/O between the devices 102-106 and virtual machines 101(a)-101(c) may be handled via hypervisor 101(d). For example, in some embodiments, hypervisor 101(d) may emulate a generic I/O device as connected to a virtual machine. An attempt by the virtual machine to perform I/O may cause a trap in a CPU of server computer 101. The trap may result in the execution of a routine of hypervisor 101(d) that determines and performs the I/O activity attempted by the virtual machine. For example, if the virtual machine attempts to send a TCP packet using an emulated network interface controller, hypervisor 101(d) may determine and initiate the transmission on the (real) network interface controller 102. In this manner, multiple virtual machines may use the same I/O device by passing requests through hypervisor 101(d). However, in some cases performing this emulation may introduce significant overhead.

In some embodiments, I/O between the device 102-106 and the virtual machine 101(a)-101(c) may be directly handled by the virtual machine. For example, direct memory access (DMA) may be used to exchange data between the virtual machine and the I/O device. In DMA-based I/O, a segment of memory may be determined that is written to and read from by both a virtual machine and an I/O device. Thus, a write to memory by the virtual machine may be directly read by the I/O device, and vice versa. This allows for lower overhead communication between the virtual machine and the I/O device. However, in some embodiments, DMA operations may not be routed through a central processing unit (CPU) of server computer 101, and may not be directly visible to hypervisor 101(d).

In some cases, it may be desirable to log communication between an I/O device and server computer 101. For example, it may be useful for a hypervisor 101(d) to know DMA operations performed by an I/O device. To provide logging functionality, various embodiments may utilize one or more I/O logging buffers that capture I/O device traffic.

Figure 1B:
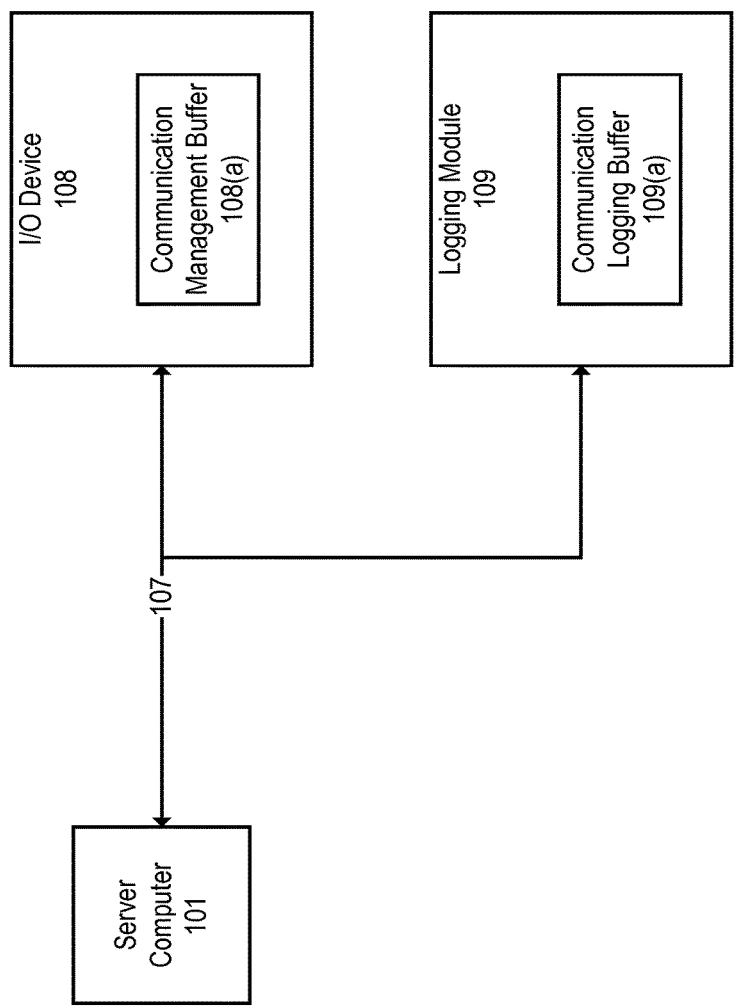
FIG. 1B shows a block diagram illustrating an example of a module for logging communication between a server computer and an I/O device.

FIG. 1B shows a diagram illustrating communication between server computer 101 and an I/O device 108, via a communication channel 107. The communication is logged by a logging module 109. In various embodiments, logging module 109 may be part of I/O device 108, server computer 101, or may be implemented separately.

I/O device 108 may include any device that inputs and/or outputs data along the communication channel 107. With reference to FIG. 1A, examples of I/O devices 108 may include network interface controller 102, host bus adapter 103, display adapter 104, USB controller 105, and RAID controller 106. Typically, I/O device 108 may comprise a communication management buffer 108(a) that may be used to manage communication between I/O device 108 and server computer 101. For example, in some embodiments, I/O device 108 may use communication management buffer 201(a) to keep track of data sent and/or received by I/O device 108. In some embodiments, communication management buffer 108(a) may be a circular buffer.

Logging module 109 may be operable to log data traffic sent over communication channel 107 between server computer 101 and I/O device 108. For example, in some embodiments, communication channel 107 may be a PCI Express bus, an Ethernet network, etc.

In some embodiments, logging module 109 may include a communication logging buffer 109(a) operable to capture and store traffic data elements sent via communication channel 107. A "traffic data element" may include any data or other information associated with communication traffic to, from, or inside an I/O device. Traffic data can include messages or other data passed along a communication medium such as communication channel 107. For example, if the communication medium is a PCI Express bus, the traffic data may include transaction layer packets sent across the bus. A traffic data element may be, for example, a single transaction layer packet. If the communication medium is an Ethernet network, the traffic data may include TCP or UDP packets sent across the network. A traffic data element may be, for example, a TCP/IP packet or a UDP packet. Traffic data elements may be of any suitable length. For example, the traffic data elements can be of fixed length (e.g., if there is a predefined packet size), or of variable length.

Figure 3:
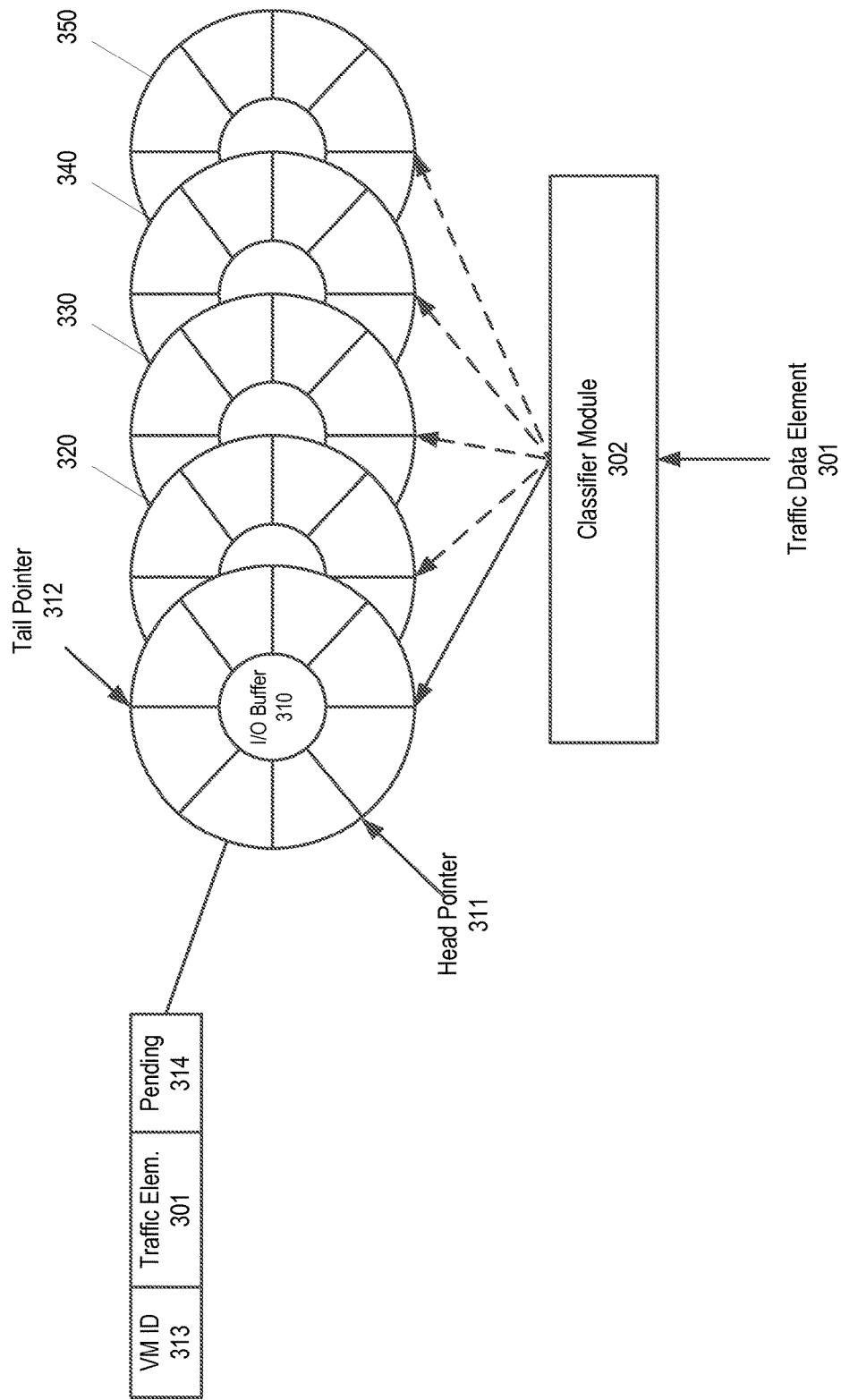
FIG. 3 illustrates an example implementation of routing traffic to one of a plurality of I/O logging buffers for logging.

In some embodiments, logging module 109 may also be operable to classify traffic data elements into one of a plurality of communication logging buffers 109(a), or to determine whether a traffic data element should be stored. FIG. 3, described below, shows an example of a logging module comprising a classifier in accordance with some embodiments of the disclosed technologies.

Figure 2:
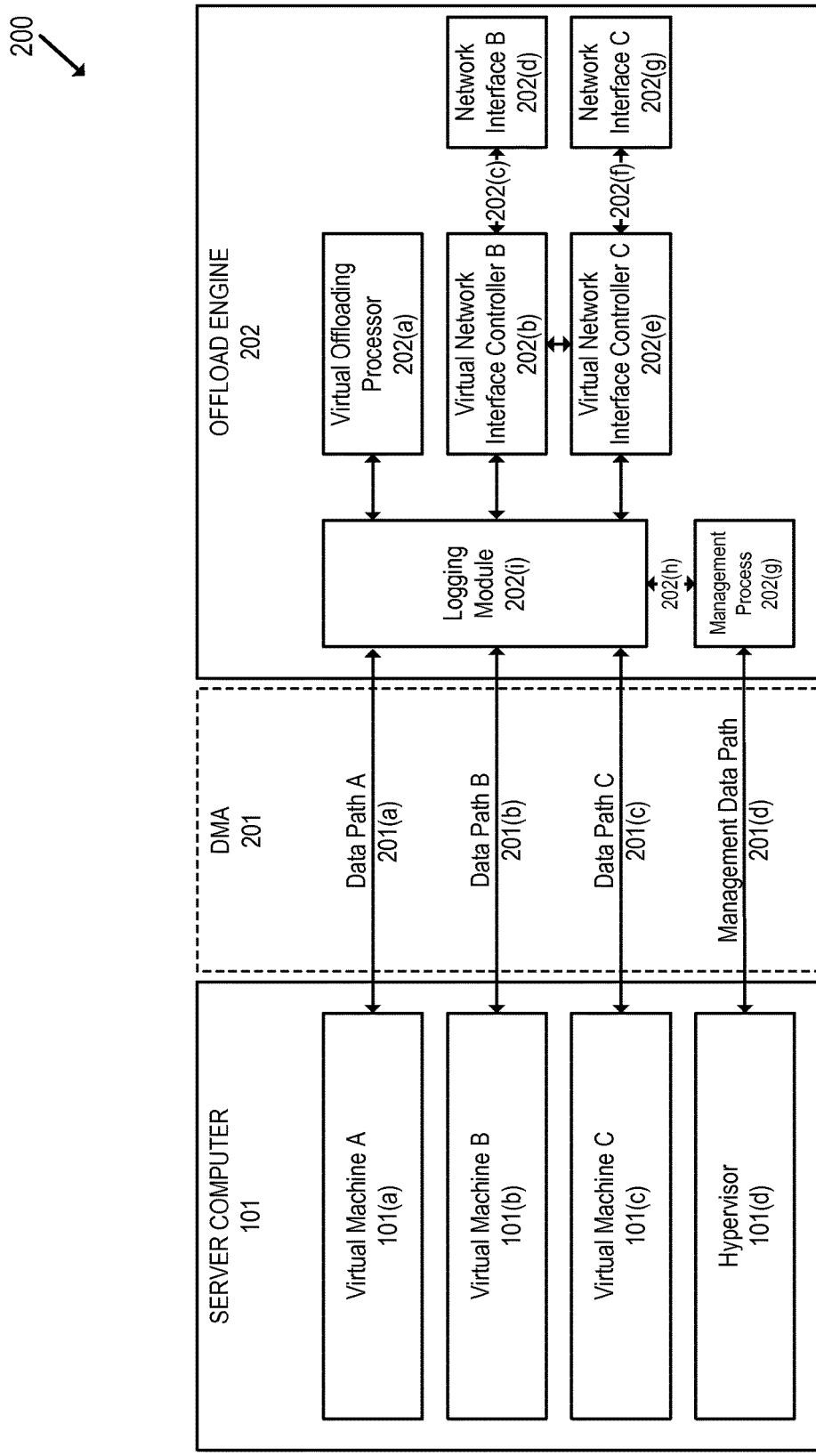
FIG. 2 shows an example of a block diagram illustrating communication between a server computer and an offload engine via a direct memory access (DMA) channel, wherein traffic via the DMA channel is logged.

FIG. 2 shows a block diagram that illustrates one example of communication between a server computer 101 and an offload engine 202 via a direct memory access (DMA) channel 201, wherein traffic via channel 201 is logged by a logging module 202(i). In some embodiments, offload engine 202 may be a peripheral card, such as a PCI Express card. However, it should be noted that in some embodiments other systems may be used for logging I/O device communication.

As shown in FIG. 2, the server computer 101 may execute a plurality of processes, such as virtual machines A-C 101(a)-101(c) and a hypervisor 101(d). In addition, an offload engine 202 may emulate a plurality of I/O devices, such as virtual offloading processor 202(a), and virtual network interface controllers B 202(b) and C 202(e). Offload engine 202 may also include a management process 202(h). Each of the above-described components of server computer 101 and offload engine 102 may communicate using data paths 201(a)-(d) over a DMA communication channel 201. The DMA communication channel 201 may be any communication channel over which DMA activity may be conducted, such as PCI, PCI Express, SATA, etc.

Virtual machine A 101(a) may be any suitable emulation of a computer system. Virtual machine A 101(a) may be in communication with a virtual offloading processor 202(a) via a data path A 201(a). Virtual offloading processor 202(a) may include one or more processing elements such as microprocessors. For example, virtual offloading processor 202(a) may include a general purpose graphical processing unit (GP-GPU), an application-specific instruction-set processor (ASIP), or another specialized processing element that may be better suited for certain tasks (e.g., secure billing and transaction processing) than a primary CPU of server computer 101.

Virtual machine B 101(b) may also be any suitable emulation of a computer system. Virtual machine B 101(b) may be in communication with a virtual network interface controller (NIC) B 202(b) via data path B 201(b). Virtual NIC B 202(b) may be configured to perform network operations such as sending and receiving packets. Virtual NIC B 202(b) may be in communication with a network interface B 202(d) via an internal bus 202(c). Network interface B 202(d) may be any suitable interface to a computer network. In one example, network interface B 202(d) may be a physical Ethernet port. In another example, network interface B 202(d) may be a virtual network interface (e.g., a virtual function) that shares the same physical Ethernet port with one or more other virtual network interfaces. Virtual machine C 101(c) may similarly be in communication with virtual NIC C 202(e) and network interface C 202(g).

In some embodiments, the logging module 202(i) may be used to store, configure, and log traffic associated with offload engine 202. As shown in FIG. 2, logging module 202(i) may receive communication traffic from each of data paths 201(a)-(d). Logging module 202(i) may then classify and log the received traffic (e.g., in one or more buffers). Elements of a logging module according to some embodiments of the disclosed technologies are shown in FIG. 3.

The virtual machines 101(a)-(c) running on server computer 101 may be managed by hypervisor 101(d). Hypervisor 101(d) may, for example, be configured to create, start, monitor, stop, and delete virtual machines 101(a)-(c). In addition, hypervisor 101(d) may be configured to communicate with a management process 202(g) on offload engine 102 via a management data path 201(d). The management process 202(g) may be used to, for example, create or remove virtual devices such as devices 202(a)-202(c) and manage data logs at a logging module 202(i) via a logging interface 202(h). For example, in some embodiments, management data path 201(d) may be used by server computer 101 or another entity (e.g., using an out of band access procedure) to retrieve logs generated using logging module 202(i). In some embodiments, management process 202(g) may employ access control restrictions or other security properties in order to safeguard access to logging module 202(i).

It should be noted that although certain virtual devices are shown as part of the offloading engine 202 of FIG. 2 (i.e., virtual offloading processor 202(a) and virtual network interface cards B and C 202(b) and 202(e)), embodiments may generally relate to any suitable virtual or physical I/O device. In addition, although in FIG. 4 virtual machines 101(a)-(c) and virtual devices 202(a), 202(b) and 202(e) have a one-to-one correspondence, in various embodiments a virtual machine may be associated with zero, one, or multiple virtual devices on an offload engine. Furthermore, although FIG. 2 is described with reference to a plurality of virtual machines running on a server computer 101, it should be noted that in some embodiments server computer 101 may also run a single, non-virtualized operating system.

FIG. 3 shows an example implementation for logging traffic at one of a plurality of I/O logging buffers 310-330. The I/O logging buffers 310-350 shown in FIG. 3 are circular buffers. However, embodiments may use any suitable buffer for logging I/O device traffic. In some embodiments, the system of FIG. 3 may be included in logging module 202(i) of FIG. 2.

As shown in FIG. 3, a traffic data element 201 is routed to one of a plurality of circular buffers 310-350 for logging. A "traffic data element" may include any data or other information associated with communication traffic to, from, or inside an I/O device or offload engine (e.g., offload engine 202). Traffic data can include messages or other data passed along a communication medium such as DMA communication channel 201. For example, if the communication medium is a PCI Express bus, the traffic data may include transaction layer packets sent across the bus. A traffic data element may be, for example, a single transaction layer packet (TLP). If the communication medium is an Ethernet network, the traffic data may include TCP or UDP packets sent across the network. A traffic data element may be, for example, a TCP/IP packet or a UDP packet. Traffic data elements can be of fixed length (e.g., if there is a predefined packet size), or of variable length.

Traffic data element 301 may be determined from any suitable source. In some embodiments, traffic data element 301 may be any data element transmitted on a communication channel 201. In other embodiments, traffic data element 301 may be a traffic data element transmitted on an internal bus, such as internal buses 102(c) and 102(f) of offload engine 102. In yet other embodiments, traffic data element 301 may be determined from a plurality of communication channels and/or buses. In addition, it should be noted that in some embodiments, traffic data may not be quantized into traffic data elements 301 before being received by classifier module 302. Rather, classifier module 302 may inspect data traffic and determine traffic data elements (e.g., packets), such as traffic data element 301, from the traffic data sent across one or more communication channels and/or buses.

In order to log the traffic data element 301, element 301 is first provided to a classifier module 302. Classifier module 302 may include any combination of software and hardware operable to determine a circular buffer to which the traffic data element 301 is to be routed. In one embodiment, classifier module 302 may be implemented as part of management process 202(g) or logging module 202(i) of offload engine 202.

In some embodiments, classifier module 302 may route the traffic data element 301 according to the source of element 301. In other embodiments, classifier module 302 may route the traffic data elements according to the intended destination of the data traffic. In yet other embodiments, classifier module 302 may route the traffic data elements based on a virtual machine or a virtual device associated with the traffic data. In further embodiments, the traffic data elements can be routed using a combination of the above criteria and/or other criteria.

In addition, classifier module 302 may determine criteria to route traffic data element 301 in any suitable manner. For example, in some embodiments, classifier module 302 may perform a detailed analysis of traffic data element 301, such as a deep packet inspection, to determine routing criteria. In some embodiments, classifier module 302 may review a subset of traffic data element 301 to determine routing criteria. For example, if traffic data element 301 is a data packet (e.g., a TCP packet), the header of the packet may be inspected to route the packet to an appropriate circular buffer. In one example, the MAC address of a virtual device associated with the packet is used to route the packet to a circular buffer corresponding to the virtual device.

Once the traffic data element 301 is routed to an appropriate circular buffer, the circular buffer may add the traffic data element. For example, as shown in FIG. 3, traffic data element 301 may be routed to circular buffer 310. Circular buffer 310 may maintain a head pointer 311 and a tail pointer 312. A buffer entry for traffic data element 301 may then be created. For example, if each circular buffer is associated with a virtual device, the buffer entry may comprise a virtual machine ID 313 associated with the virtual device, the traffic data element 301, and a field 314 indicating whether the traffic data element 301 is pending or completed. Traffic data element 301 can then be added to circular buffer 310 at the head pointer, and the head pointer can then be incremented.

In some embodiments, classifier module 302, circular buffer 310, and/or another entity may be used to determine that a new traffic data element is a response to or otherwise indicates the completion of traffic data element 301. For example, if traffic data element 301 is a TCP packet, classifier module 302 may determine that a new traffic data element corresponding to the acknowledgement of traffic data element 301 was received. Accordingly, once traffic data element 301 is determined to be completed, the status stored in pending field 314 can be updated to a completed state. If no buffer entries from the tail pointer to the updated entry are pending, the tail pointer can be incremented to the entry directly after the updated buffer entry. In this manner, additional space in the circular buffer can be created for new traffic data elements. In a typical embodiment, a buffer may be large enough to hold all currently pending traffic data elements.

In addition, it should be noted that although the traffic data elements in FIG. 3 are logged by circular buffers, embodiments of the disclosed technologies may use any other suitable data structure to store the traffic data elements. Examples of alternate data structures that can be used to implement a buffer may include queues, arrays, linked lists, etc.

Figure 4:
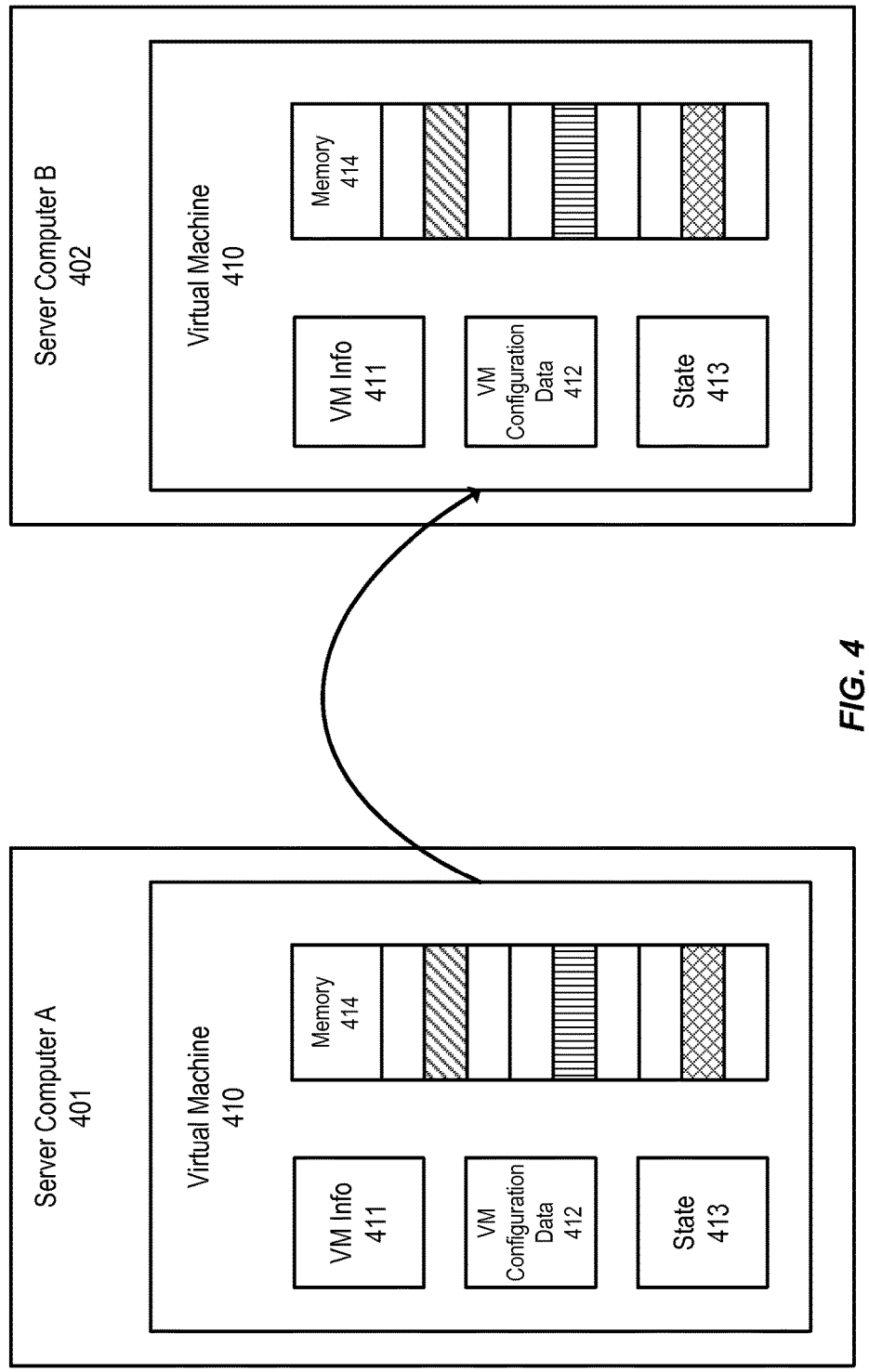
FIG. 4 shows a block diagram illustrating the transfer of a virtual machine between two computing devices.

In some cases, it may be desirable to transfer a running virtual machine from one server computer to another. FIG. 4 shows a block diagram illustrating the transfer of a virtual machine 101(a) between a server computer A 401 and a server computer B 402. As shown in FIG. 4, copying the virtual machine 410 may comprise copying: virtual machine information 411, virtual machine configuration data 412, state 413, and memory 414.

Virtual machine information 411 may include any data or other information relating to the identification of virtual machine 410. For example, virtual machine information may include the name of the virtual machine, and the location of various files relating to virtual machine 410, such as one or more virtual disks of the virtual machine.

Virtual machine configuration data 412 may include any data relating to setup and/or configuration of virtual machine 410. For example, configuration data 412 may include the number and type of peripherals connected to virtual machine 410. Configuration data 412 may also include data relating to these peripherals. For example, if a network interface controller is connected to virtual machine 410, configuration data 412 may include the type of network interface controller (e.g., hardware or emulated), the mode of operation of the network interface controller (e.g., bridged, NAT translation, etc.), properties of the network interface controller (e.g., the MAC address of the controller), etc. Configuration data 412 may include similar data for any number of I/O devices or other peripherals. In addition, configuration data 412 may include other data relating to the state of the virtual machine that may not be stored in memory or on a virtual disk, such as basic input/output system (BIOS) settings. In addition, in some embodiments, configuration data 412 may include an indication of locations and/or pages in memory associated with DMA communication with an I/O device.

State 413 may include any data relating to the state of virtual machine 410. The state of virtual machine 410 may include, for example, the state of any I/O devices and/or virtual functions of I/O devices in communication with virtual machine 410. For example, state 413 may include the contents of an I/O logging buffer for one or more of the I/O devices in communication with virtual machine 410.

Figure 6:
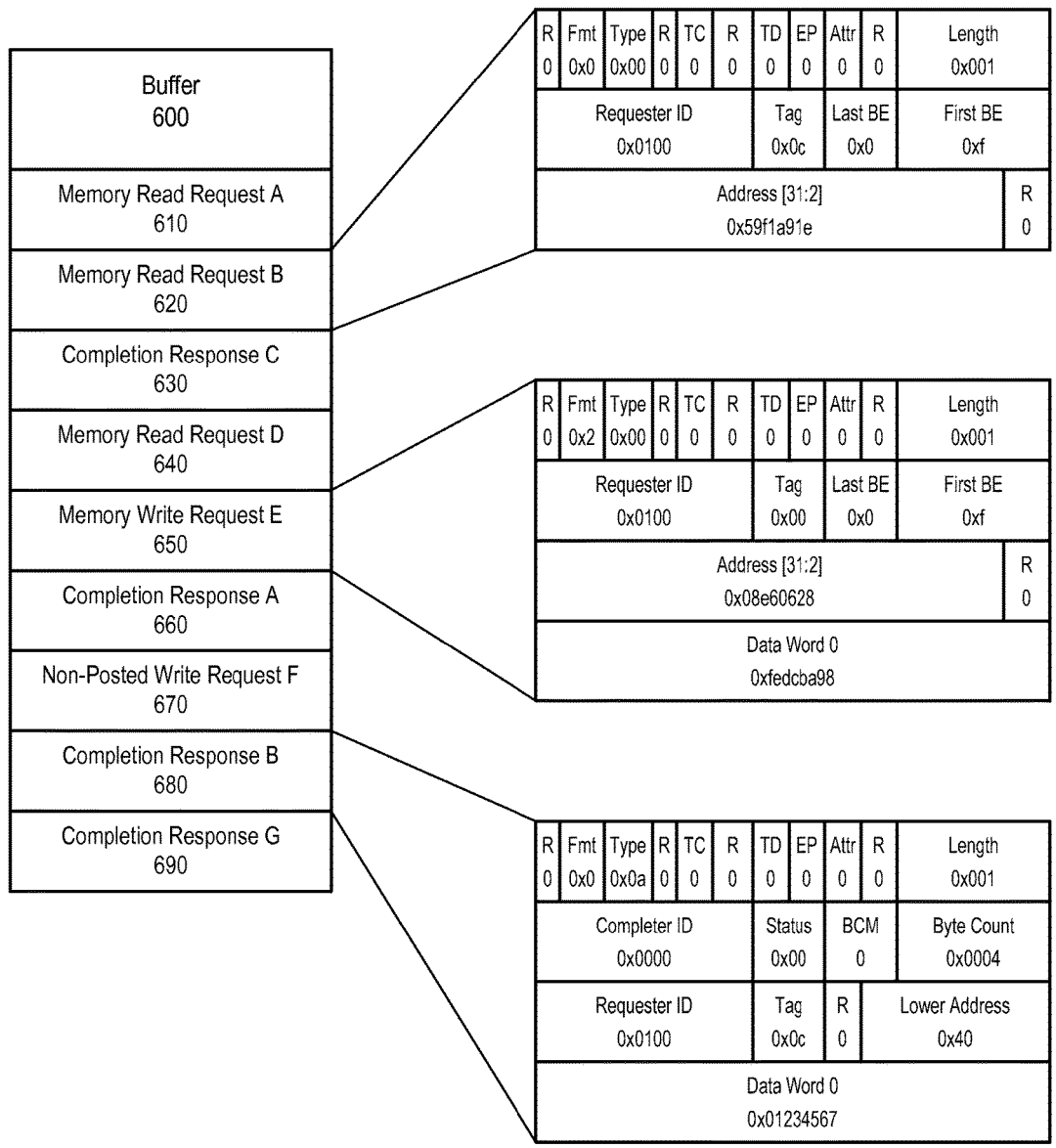
FIG. 6 shows example contents of an I/O logging buffer in accordance with some embodiments of the disclosed technologies.

Virtual machine memory 414 may include any data relating to the contents of main memory (e.g., RAM) associated with virtual machine 410. For example, virtual machine memory 414 may include the contents of a VM physical memory (e.g., VM physical memory 630 as shown in FIG. 6), and a VM page table mapping the pages in the VM physical memory to one or more VM virtual memories (e.g., VM virtual memory 610 as shown in FIG. 6).

In order to effect a transfer of virtual machine 410 from server computer A 401 to server computer B 402, it may be necessary to copy each of VM information 411, VM configuration data 412, state 413, and VM memory 414 from server computer A 401 to server computer B 402. Typically, VM information 411 and VM configuration data 412 may not change while virtual machine 410 is running, or may change slowly. Thus, it may be relatively easy to copy information 411 and data 412 over a sufficiently fast network connection.

However, state 413 and VM memory 414 may change quickly as the VM 410 is being executed. One solution to this issue is to perform a preliminary copy of the entire state 413 and VM memory 414, and then perform a second copy that only copies memory pages and state changed since the preliminary copy. One method for determining changed pages is by noting which pages cause a page fault. However, this method may not identify pages modified by an I/O device during or since a DMA operation. One method for addressing this issue is shown in FIG. 5.

II. Methods

Figure 5:
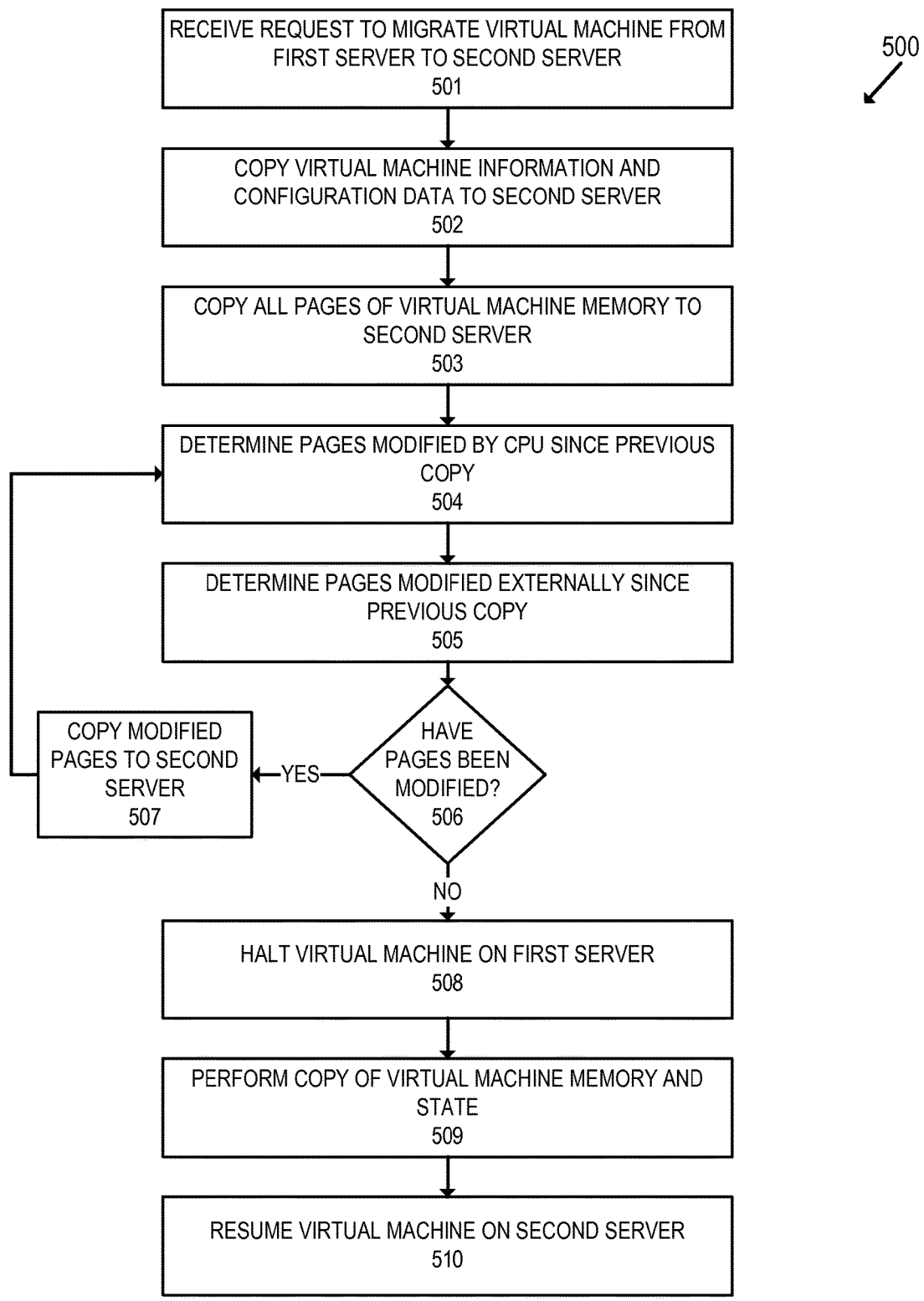
FIG. 5 shows an example of a method for transferring a virtual machine between two servers.

FIG. 5 shows an example of a method 500 for transferring a virtual machine between two servers using an I/O logging buffer such as buffer 600. Some or all of method 500 (or any other methods and processes described herein, or variations and/or combinations thereof) may be performed under the control of one or more computer systems configured with executable instructions and may be implemented as code (e.g., executable instructions, one or more computer programs or one or more applications) executing collectively on one or more processors. For example, method 500 may be performed by server computer 101 running one or more virtual machines.

At step 501, a request is received to migrate a virtual machine from a first server to a second server. The request may be received, for example, from a user such as a system administrator, or from an automated process such as load balancing software.

At step 502, virtual machine information and configuration data is copied to the second server. Virtual machine information can include any data or other information relating to the identification of the virtual machine. For example, virtual machine information may include the name of the virtual machine, and the location of various files relating to the virtual machine, such as one or more virtual disks of the virtual machine. Virtual machine configuration data may include any data relating to setup and/or configuration of the virtual machine. For example, configuration data may include the number and type of peripherals connected to the virtual machine. Additional description of virtual machine information and virtual machine configuration data may be found with reference to VM info 311 and VM configuration data 312 of FIG. 3.

Figure 7:
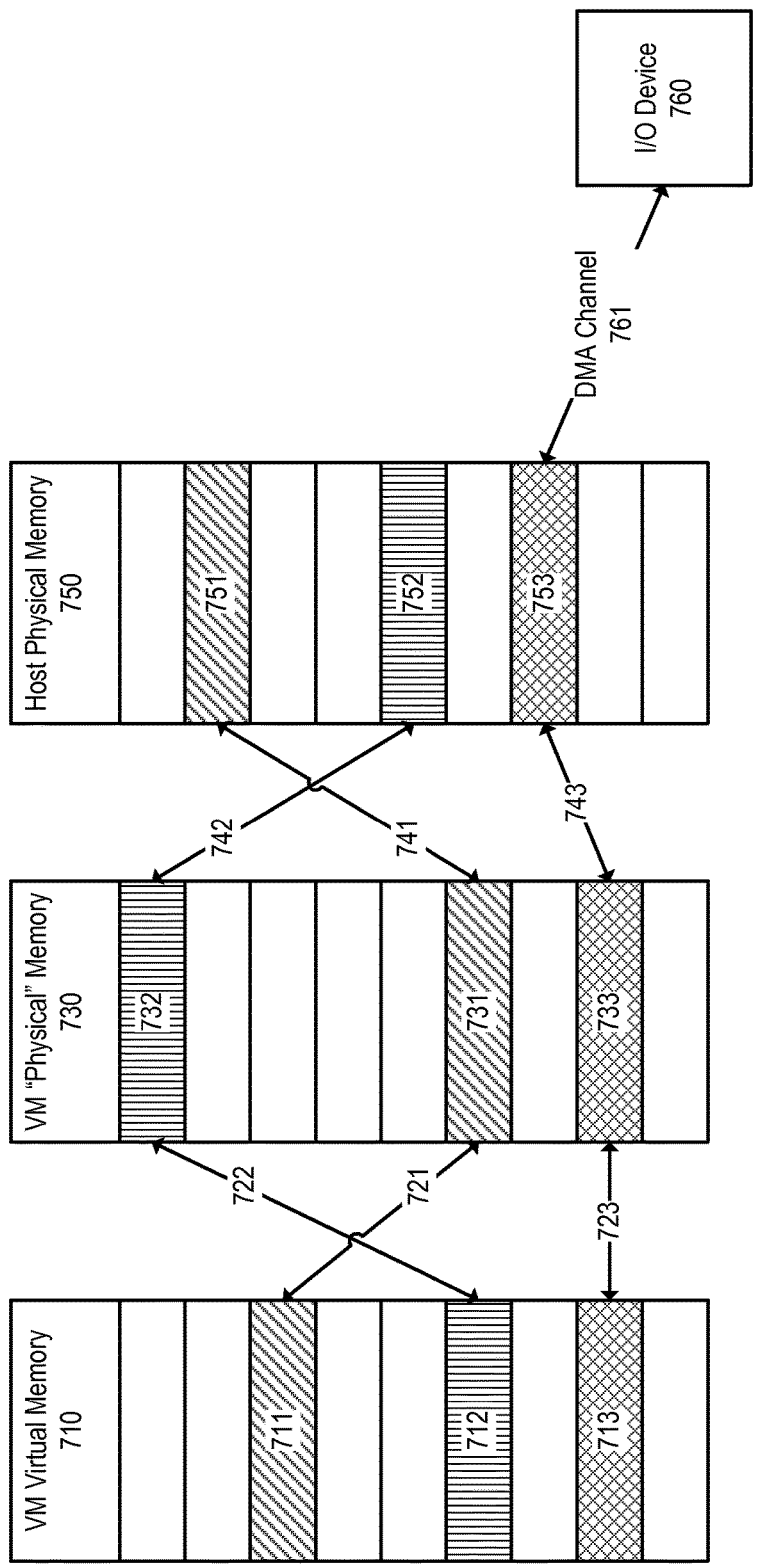
FIG. 7 shows a diagram of the mapping between pages in physical memory, VM physical memory, and VM virtual memory in accordance with some embodiments of the disclosed technologies.

At step 503, a preliminary copy of all virtual machine memory to the second server is performed. In some embodiments, the preliminary copy may comprise copying all of a virtual machine's main memory. One example of a VM physical memory 730 is shown in FIG. 7. In some embodiments, the copy may be compressed or otherwise made more efficient. For example, rather than copying each bit of an unused or an empty page, embodiments may indicate that the page is unused or empty to the second server.

At step 504, after the preliminary copy completes, pages modified by the processor of the first server are determined. One method of making such a determination is to mark pages as "dirty" when they are accessed. For example, a virtual machine attempting to access a page may cause a page fault. This page fault may be trapped by a hypervisor (e.g., hypervisor 101(d)). In addition to loading the requested page into memory, the hypervisor may indicate that the page has been accessed. For example, the hypervisor may set a dirty bit in a corresponding entry in a shadow page table, or may maintain a bitmap of dirty pages.

At step 505, pages that have been modified externally during and after the preliminary copy of step 503 are determined. External modification of a page may include any modification of the page that is not identified by the hypervisor. For example, a DMA write to a memory address may involve sending a memory write request from an I/O device to a memory controller, bypassing a CPU. Thus, the hypervisor may not know that the page has been modified.

In some embodiments, an I/O logging buffer may be inspected to determine DMA operations on memory. FIG. 6 shows example contents of an I/O logging buffer 600 in accordance with some embodiments of the disclosed technologies.

In the embodiment shown in FIG. 6, buffer 600 includes traffic data obtained from a PCI Express bus; the traffic data elements 610-690 are transaction layer packets. In principle, buffer 600 may include any transaction layer packet. However, for ease of illustration and description, only memory read requests, completion responses, and memory write requests are shown. Furthermore, embodiments of the disclosed technologies may use I/O logging buffers to store traffic data from any other suitable communication protocol, and may store the buffers in any suitable manner.

A "memory read request" may include any packet requesting the contents of memory at a requested address. The contents of memory read request B 620 are shown in further detail. As seen in FIG. 6, memory read request B 620 includes a plurality of data fields, including a requester ID field (e.g., 0x0100) that indicates the device initiating the read request, a tag for the request (e.g., 0x0c), a number of memory words to be read (0x001), and the most significant 30 bits of the memory address to be read (0x59f1e91e). However, in some embodiments (e.g., in systems using 64-bit memory addressing), a memory address may be specified using a different number of bits. Buffer 600 may include other read requests, such as memory read request A 610 and memory read request D 640. In some embodiments, the data requested by the memory read request may be returned in a completion response.

A "memory write request" may include any packet requesting a write of data to a memory address. An example of the contents of a memory write request are shown in further detail for memory write request E 650. As shown in memory write request 650, a memory write request can include a plurality of data fields, such as a length or number of data words to be written (e.g., 0x0001), a requester ID field (e.g., 0x0100) that indicates the device initiating the write request, a tag for the request (e.g., 0x00), an address that the data is to be written to (e.g., 0x08e60628), and the data word to be written (e.g., 0xfedcba98). In some embodiments, such as the embodiment shown in FIG. 6, a memory write request may be by default a "posted write"—that is, the write request does not require an acknowledgement from the completer that the memory write actually occurred. However, in some cases, a write request may be a "non-posted write," which may require a completion response indicating the success or failure of the write. Non-posted write request F 670 is one example of a non-posted memory write request.

A "completion response" may include any packet responding to a request, such as a read or non-posted write request. An example of the contents of a completion response is shown in further detail for completion response B 680, which is in response to memory read request B 620. As shown in completion response B 680, a completion response can include a plurality of data fields, such as a length of the requested data (e.g., 0x0001), a completer ID field (e.g., 0x0000) that indicates the device completing or servicing the requested activity (e.g., a read or write), a byte count of the payload of the completion response (e.g., 0x0004), and a requester ID (e.g., 0x0100) of the device requesting the activity. As completion response B 680 is in response to a read request, completion response B 680 also includes a data word (e.g., 0x01234567) that indicates the data stored in memory at the requested address.

In the embodiment shown in FIG. 6, the requester ID and completer ID may be used to determine the activities being performed by the devices in the logged communication channel. For example, if the requester ID of 0x0100 corresponds to a network interface controller, and completer ID 0x0000 corresponds to a main memory controller, then memory read request B 620 may be construed as a DMA read to address 0x59f1a91e. Similarly, memory write request E 650 may be construed as a DMA write of the data 0xfedcba98 to memory address 0x08e60628.

Once one or more DMA operations are determined to have occurred on the I/O device, a corresponding page in the virtual machine's physical memory may be determined. For example, FIG. 7 shows a diagram of the mapping between memory pages in a virtual machine's (VM) virtual memory 710, a VM "physical" memory 730, a host's physical memory 750, and a direct memory access (DMA) channel 761 from an I/O device 760 to the host's physical memory 750 in accordance with one embodiment. A "memory page" (also referred to as simply a "page") may include any suitable contiguous block of memory. Memory pages may be of a fixed length or page size—the number of bits or bytes of data in the page.

As shown in FIG. 7, a virtual machine's virtual memory 710 may comprise a plurality of memory pages. These memory pages store state relating to one or more applications or processes running on a virtual machine. Each application or process running on a virtual machine can have a separate virtual memory space. Thus, although only one VM virtual memory 710 is shown, in some embodiments multiple applications running on one or more virtual machines (e.g., a web server, a database, and word processing software) may each have a VM virtual memory. In FIG. 7, three memory pages 711-713 in VM virtual memory are shaded in different patterns.

As mentioned above, an operating system of a virtual machine may maintain a plurality of virtual address spaces, each associated with a virtual memory 710. Thus, a process of address translation may be needed to map the address of each page in a VM virtual memory 710 to an address of the page in a VM's "physical" memory—that is, the memory that appears to the operating system of the virtual machine to be the machine's physical memory. The term "physical" is in quotes to emphasize that the addresses of memory 730 appear to the operating system of the VM to be physical, but these addresses may not actually be the physical addresses at which the pages are stored. These mappings may be determined by consulting a VM page table—a data structure that identifies the location of a page in VM physical memory 730 corresponding to a page in VM virtual memory 710. For example, page 711 in VM virtual memory 710 may be mapped to a page 731 in VM physical memory using an entry 761 in the VM page table. Similarly, pages 712 and 713 in VM virtual memory 710 may be mapped to pages 732 and 733 in VM physical memory 730 using page table entries 722 and 723.

A server computer may run multiple virtual machines. Thus, a second process of address translation may be needed to map the address of each page in a VM physical memory 730 to an address of the page in a host's physical memory—that is, an address that can be provided to the memory controller to retrieve data physically stored at that memory location. These mappings may be determined by consulting a shadow page table—a data structure that identifies the location of a page in VM physical memory 730 corresponding to a page in VM virtual memory 710. For example, page 731 in VM physical memory 730 may be mapped to a page 751 in host physical memory 750 using an entry 741 in the shadow page table. Similarly, pages 732 and 733 in VM physical memory 730 may be mapped to pages 752 and 753 in host physical memory 750 using page table entries 742 and 743.

I/O devices may be unaware of address translation that takes place between a VM virtual memory 710, a VM physical memory 730, and/or a host physical memory 750. Nevertheless, the above-described system of address translation may be used to allow applications in a virtual machine to access data written using a direct memory access (DMA) channel 761 from an I/O device 760, and write data that is read using DMA channel 761 by I/O device 760.

For example, in one embodiment, a hypervisor 101(*d*) may reserve a page 753 of host physical memory 750 for DMA access to and from I/O device 760. This page 753 may be mapped using shadow page table entry 743 to a page 733 in VM physical memory 730. Similarly, page 733 in VM physical memory 730 may be mapped using a VM page table entry 723 to a page in VM virtual memory 710. Thus, an application running in a virtual machine can directly access the memory written to and read by I/O device 760.

In some embodiments, an I/O logging buffer such as buffer 600 of FIG. 6 may be inspected to determine modified pages. For example, buffer 600 comprises a plurality of memory write requests 650 and 650. For each memory write request, embodiments may identify the address in memory written to by the request. For example, memory write request E 650 identifies the most significant 30 bits of the memory address to be 0x08e60628. For each such memory address identified, embodiments may determine a corresponding page in the host's physical memory. For example, with reference to FIG. 7, a page 753 may be determined. Next, a shadow page table may be used to determine an equivalent page in the virtual machine's physical memory.

Again with reference to FIG. 7, the equivalent page in VM physical memory 730 is page 733. This page may marked as dirty in a shadow page table or a dirty page bitmap.

However, in other embodiments, an I/O device or virtual function of an I/O device may directly perform memory operations in the address space of VM physical memory 730. For example, an I/O memory management unit (IOMMU) or other software or hardware element may translate memory operations by the I/O device to the host physical memory 750 address space. In such embodiments, no address translation may be needed to determine the page 733 of VM physical memory 730 modified by the I/O device.

Returning to FIG. 5, at conditional step 506, if any pages were identified as modified (e.g., in steps 504 or 505), the method proceeds to step 507. Otherwise, if no pages of the virtual machine were modified after the preliminary copy, the method proceeds to step 508. In some embodiments, the method may proceed to step 508 as long as the number of modified pages is below a threshold value. In addition, in some embodiments, the method may proceed to step 508 if a predetermined number of iterations of steps 504-507 have occurred. In such embodiments, step 508 may comprise copying the modified pages after the virtual machine is halted on the first server.

Returning to FIG. 5, at step 507, the pages modified after the preliminary copy are copied to the second server. The secondary copy may be conducted in a similar manner to the preliminary copy of step 503, but may typically copy fewer pages. After the secondary copy is completed, the method may proceed to step 504 to determine if any pages were modified during or since the secondary copy.

Figure 9:
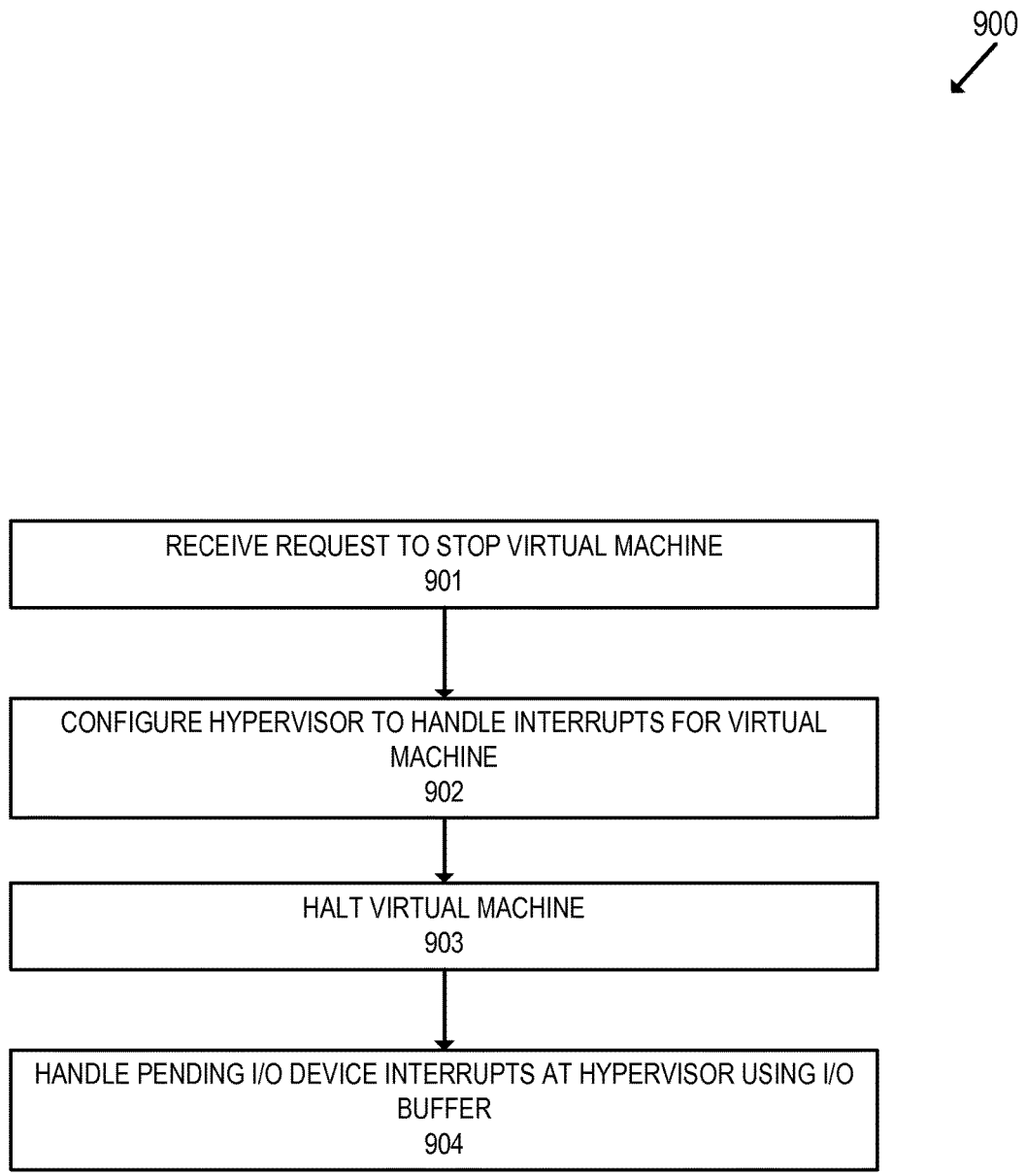
FIG. 9 shows an example of a method for stopping a virtual machine.

At step 508, the virtual machine to be transferred is halted on the first server. FIG. 9 provides additional description of stopping a virtual machine that may be performed during step 508 of method 500 in some embodiments of the disclosed technologies.

At step 509, a copy of the virtual machine memory and state is performed. The final copy may comprise ensuring that all state relating to the virtual machine is either copied to or accessible by the second server. For example, a final copy of a generally small amount of data may be carried out after the virtual machine is halted on the first server.

At step 510, the virtual machine can then be resumed by a hypervisor running on the second server. In this manner, the downtime of the virtual machine can be very small, for example on the order of seconds or milliseconds.

Figure 8:
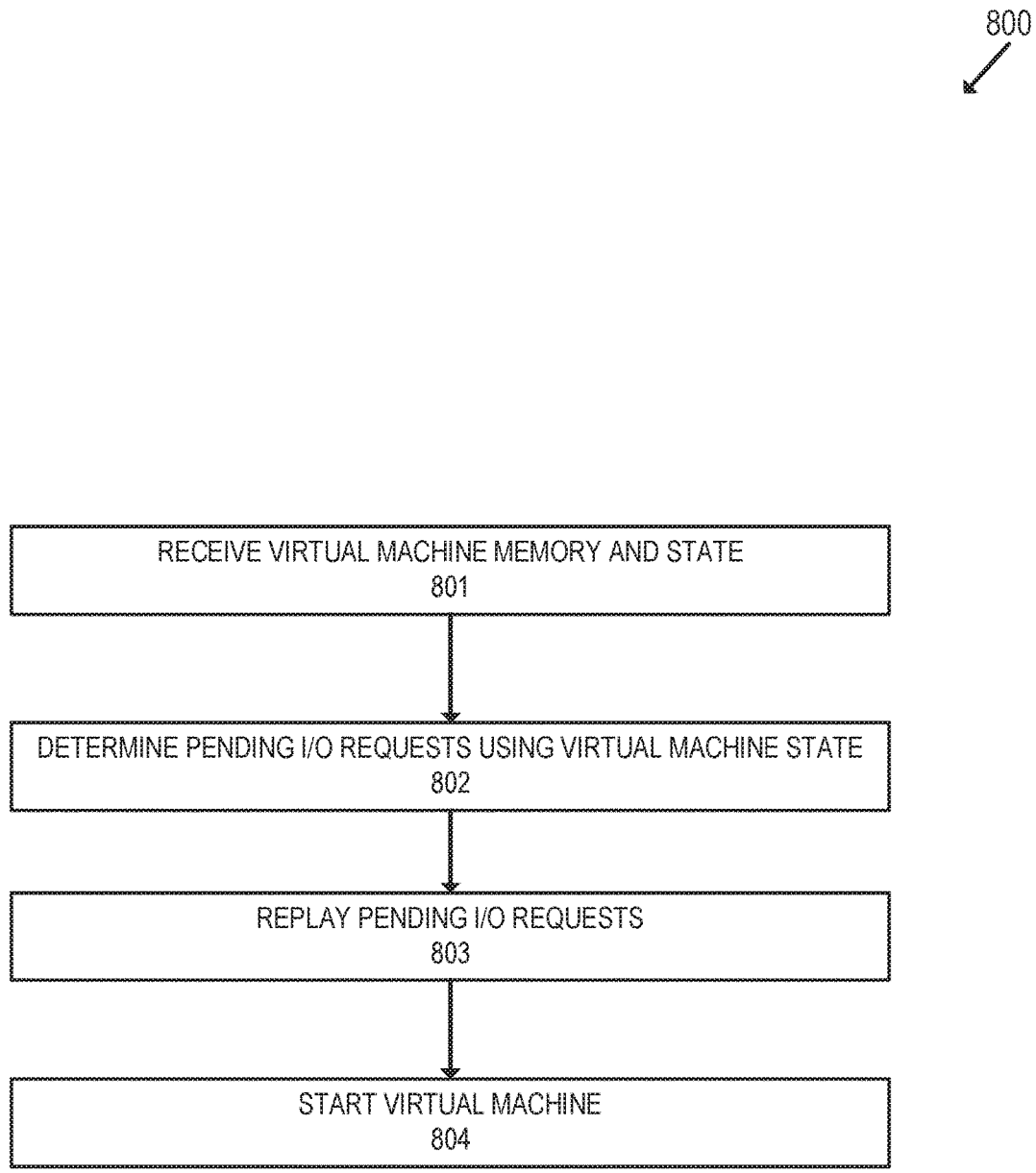
FIG. 8 shows an example method for resuming a virtual machine on a server computer.

In some embodiments, upon resuming the virtual machine on the second server, the copied state may be used to replay one or more pending I/O device requests. FIG. 8 shows a method 800 for resuming a virtual machine on a second server computer.

At step 801, the memory and state of the virtual machine are received. The virtual machine's memory may include the contents of main memory for the virtual machine. The virtual machine's state may include other state relating to the virtual machine, such as the contents of one or more I/O logging buffers for I/O devices in communication with the virtual machine.

At step 802, pending I/O requests are determined using the virtual machine state. For example, the contents of the I/O buffers may indicate that one or more traffic data elements were pending at the time of the transfer of the virtual machine to the second server computer.

At step 803, pending I/O requests are replayed. Replaying the pending I/O requests may include re-performing the I/O operation on the second server computer. For example, if prior to the transfer, the virtual machine performed a disk read operation, the virtual machine may determine that the disk read was requested but was not serviced by inspecting an I/O logging buffer. Accordingly, the virtual machine may re-request the disk read on the second server. In some cases, such as if an I/O device is network accessible, replaying the request may involve sending the request to the same I/O device. In other cases, such as if an I/O device is local to a machine, replaying the request may involve determining an equivalent I/O device on the second server computer, and directing the I/O request to the equivalent I/O device.

At step 804, the virtual machine is started on the second server computer.

In this manner, embodiments can allow for virtual machines to be transferred between servers even when there are pending I/O requests. This may provide for faster virtual machine transfer, since a hypervisor does not need to wait for I/O requests to complete before transferring the virtual machine.

FIG. 9 shows an example of a method 900 for stopping a virtual machine. In some embodiments, method 900 may be performed by a server computer such as server computer 101.

At step 901, a request is received to stop a virtual machine. The virtual machine may be stopped for any suitable reason. For example, a user such as a system administrator may desire to shut down a server computer, which may require stopping the virtual machine. Alternately, in some embodiments, the virtual machine may be stopped when transferring the virtual machine to a different computer, such as in accordance with method 700 of FIG. 7.

At step 902, the hypervisor is configured to handle interrupts for the virtual machine. In some embodiments, a hypervisor may be configured to forward interrupts to a virtual machine while the virtual machine is running. For example, when the hypervisor receives an interrupt, the hypervisor may identify an interrupt vector table in the virtual machine and call a procedure in the interrupt vector table to handle the interrupt. However, once a request to stop the virtual machine is received, the hypervisor may instead handle any interrupts relating to the virtual machine itself.

At step 903, the virtual machine is halted. In some embodiments, halting the virtual machine may comprise shutting down the virtual machine. For example, the hypervisor may simulate a hardware power off command to the virtual machine. In some embodiments, halting the virtual machine may comprise suspending the virtual machine, such as by saving the state of the virtual machine to a file in persistent storage (e.g., a hard drive).

At step 904, pending I/O device interrupts are handled at the hypervisor using an I/O logging buffer. For example, in some cases, an I/O logging buffer may indicate that an I/O device has submitted a request and is waiting for a response from the virtual machine. Rather than keeping the virtual machine running until it can satisfy all such requests, the hypervisor can inspect an I/O logging buffer to determine pending requests that need responses and service these requests.

For example, with reference to buffer 600 of FIG. 6, the hypervisor may determine that there have been a plurality of memory read requests, memory write requests, and completion responses for an I/O device. However, the hypervisor may determine that some requests have not been completed. For example, memory read request D 640 does not have a corresponding completion response. To service this request, the hypervisor may inspect the state of the halted virtual machine and identify the memory stored at the memory address requested in memory read request D 640. The hypervisor may then send a completion response for memory read request D 640.

In some cases, the hypervisor may not be able to perform an operation requested by an I/O device. For example, non-posted write request F 670 may request data to be written at an address in the memory of the virtual machine. Furthermore, since the request is a non-posted write, the I/O device may expect a completion response once the write has been completed. In some cases, the hypervisor may not be able to write the requested data. Thus, in order to "fail gracefully," the hypervisor may format a message to the I/O device that the write request was received but could not be performed.

In this manner, at least some embodiments can allow a hypervisor to halt a virtual machine and respond to I/O requests relating to the virtual machine independently. Thus, the virtual machine can be halted quickly while still following a protocol expected by an I/O device.

III. Computer Apparatus

Figure 10:
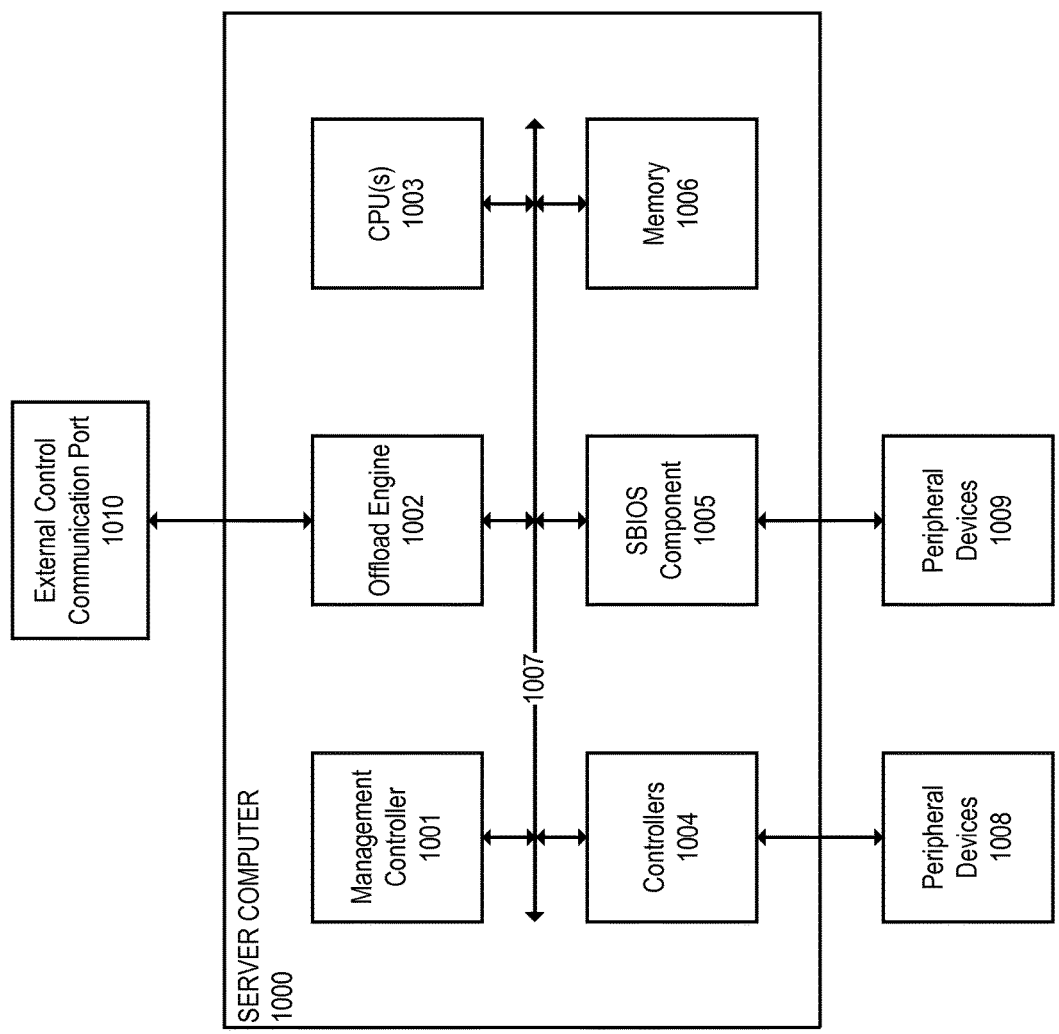
FIG. 10 shows a server computer including an offload engine according to one embodiment of the disclosed technologies.

FIG. 10 shows a server computer 1000 including an offload engine 1002 according to one embodiment. However, one skilled in the relevant art will appreciate that the disclosed illustrative components are not meant to be an exhaustive identification of all the components required by or present in a server computer 1000, and that other computing devices may be used in accordance with some embodiments. Rather, illustrative components have been identified, in a non-limiting manner, to facilitate illustration of one or more aspects of the present application. Still further, the illustrative components of the server computer 1000 can be considered logical in nature such that the physical implementation of one or more components can be varied or such that one or more of the logical components may be implemented in a virtualized manner. Additionally, one or more server computers 1000 can share one or more of the illustrated components, such as processors, graphical processing units, memory and the like.

In an illustrative embodiment, the server computer 1000 is associated with various hardware components, software components and respective configurations that facilitate the implementation of I/O device logging, which will be described in detail below. Specifically, in one embodiment, server computer 1000 can include a management controller 1001 for managing the operation of server computer 1000 in accordance with the Intelligent Platform Management Interface ("IPMI"). Specifically, the management controller 1001 can include an embedded microcontroller that manages the interface between system management software and server computer 1000 server computer 1000 components.

In communication with the management controller 1001 is an offload engine component 1002. The offload engine component 1002 can communicate as a standard bridge component for facilitating access between various physical and emulated components and a communication channel 1007. For example, offload engine component 1002 may include or simulate one or more input/output (I/O) devices. The communication channel 1007 may include, for example, a PCI Express bus, a front-side bus, and/or any other communication medium. In addition, although a single communication channel 1007 is shown in FIG. 10, it should be appreciated that in embodiments, the various components of server computer 1000 may communicate directly or indirectly through a variety of communication channels. In another aspect, the offload engine component 1002 can include embedded microprocessors to allow the offload engine component to execute computer executable instructions related to the implementation of management functions or the management of one or more such management functions, or to execute other computer executable instructions related to the implementation of the offload engine component 1002. In some embodiments, the offload engine component 1002 may be implemented using multiple discrete hardware elements, such as multiple cards or other devices. The management controller 1001 can be configured in such a way to be electrically isolated from any other component in the server computer 1000 other than the offload engine component 1002.

Also in communication with the offload engine component 1002 may be an external communication port component 1010 for establishing communication channels between the server computer 1000 and one or more network based services or other computing devices. Illustratively, the external communication port component 1010 corresponds to a network switch, sometimes known as a Top of Rack ("TOR") switch. The offload engine component 1002 can utilize the external communication port component 1010 to maintain communication channels between one or more services and the server computer 1000, such as health check services, financial services, and the like. Additionally, as will be described in greater detail below, data traffic between the offload engine component 1002 and the external communication port component 1009 can be logged.

The offload engine component 1002 can also be in communication with a System Basic Input/Output System (SBIOS) component 1005. The SBIOS component 1005 can include non-transitory executable code, often referred to as firmware, that can be executed by one or more processors and used to cause components of the server computer 1000 to initialize and identify system devices such as the video display card, keyboard and mouse, hard disk drive, optical disc drive and other hardware. The SBIOS component 1005 can also include or locate boot loader software that will be utilized to boot the server computer 1000. For example, in one embodiment, the SBIOS component 1005 can include executable code that, when executed by a processor, causes the server computer 1000 to attempt to locate PXE boot software. Additionally, the SBIOS component 1005 can include or takes the benefit of a hardware latch that is electrically controlled by the offload engine component 1002. The hardware latch can restrict access to one or more aspects of the SBIOS component 1005, such controlling modifications or configurations of the executable code maintained in the SBIOS component 1005.

The SBIOS component 1005 can be connected to (or in communication with) a number of additional computing device resources components, such as central processing units ("CPUs") 1003, memory 1006 (e.g., RAM), and the like. In one embodiment, such computing device resource components may be physical computing device resources in communication with other components via the communication channel 1007. The communication channel 1007 can correspond to one or more communication buses, such as a shared bus (e.g, a front side bus, a memory bus), a point-to-point bus such as a PCI or PCI Express bus, etc., in which the components of the bare metal hosting platform 200 communicate. Other types of communication channels, communication media, communication buses or communication protocols (e.g., the Ethernet communication protocol) may also be utilized. Additionally, in other embodiments, one or more of the computing device resource components may be virtualized hardware components emulated by the server computer 1000. In such embodiments, the offload engine component 1002 can implement a management process in which a server computer is configured with physical or emulated hardware components based on a variety of criteria. The computing device resource components may be in communication with the offload engine component 1002 via the communication channel 1007. In addition, although communication channel 1007 in FIG. 10 is shown as connecting all of components 1001-1006, it should be appreciated that a communication channel in accordance with embodiments may connect any subset of the components 1001-1006 and/or other components. For example, a communication channel may connect a PCI Express device to a CPU via a northbridge or host bridge.

Also in communication with the offload engine component 1002 via the communication channel 1007 may be one or more controller components 1004 for managing hard drives or other forms of memory. An example of a controller component 1004 can be a SATA hard drive controller. Similar to the SBIOS component 1005, the controller components 1004 can include or take the benefit of a hardware latch that is electrically controlled by the offload engine component 1002. The hardware latch can restrict access to one or more aspects of the controller component 1004. Illustratively, the hardware latches may be controlled together or independently. For example, the offload engine component 1002 may selectively close a hardware latch for one or more components based on a trust level associated with a particular customer. In another example, the offload engine component 1002 may selectively close a hardware latch for one or more components based on a trust level associated with an author or distributor of the executable code to be executed by the offload engine component. In a further example, the offload engine component 102 may selectively close a hardware latch for one or more components based on a trust level associated with the component itself.

The server computer 1000 can also include additional components that are in communication with one or more of the illustrative components associated with the device 1000. Such components can include devices, such as one or more controllers 1004 in combination with one or more peripheral devices 1008, such as hard disks or other storage devices. Additionally, the additional components of the server computer 1000 can include another set of peripheral devices 1009, such as Graphics Processing Units ("GPUs").

Figure 11:
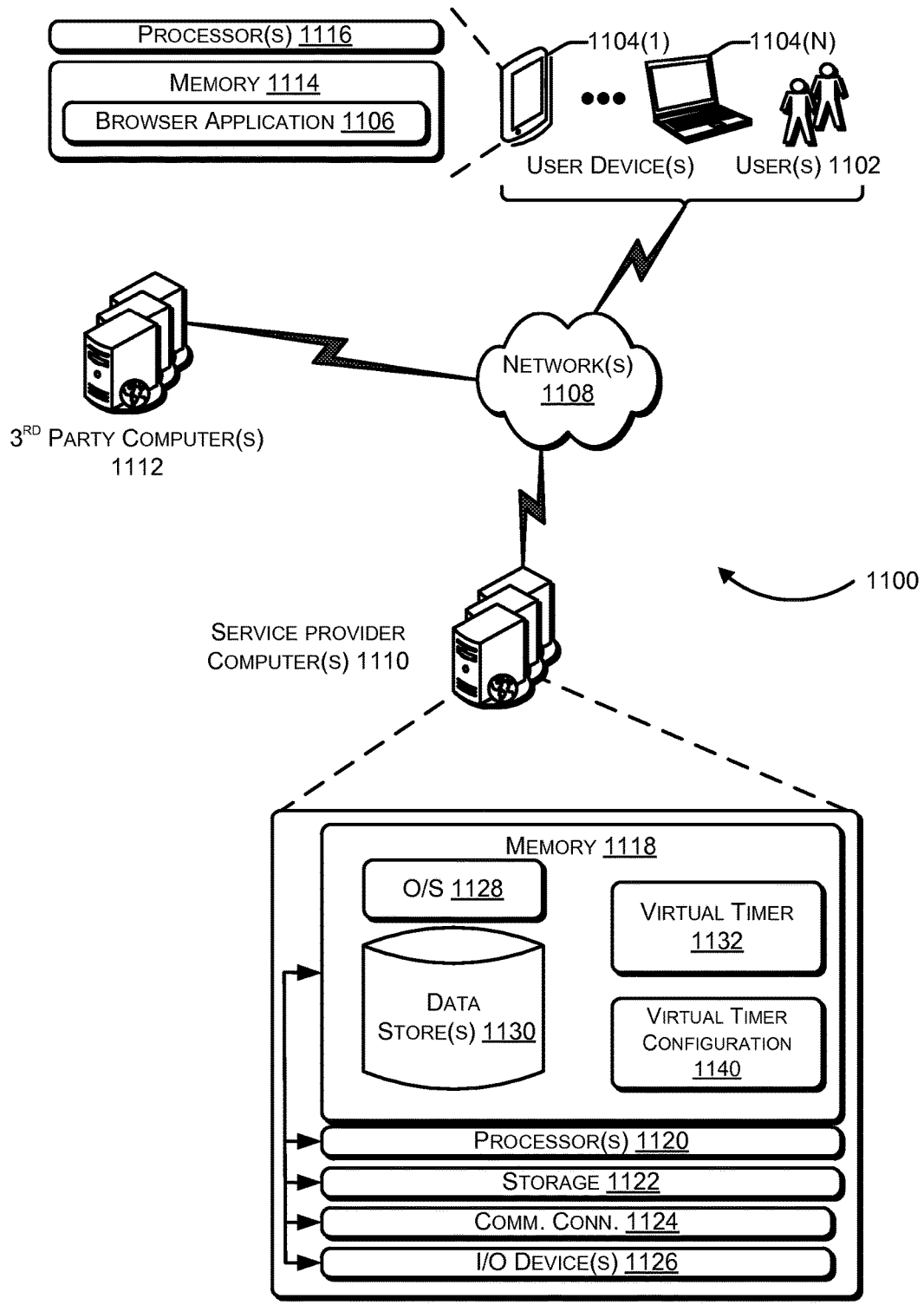
FIG. 11 shows an example architecture for features and systems described herein that includes one or more service provider computers and/or a user device connected via one or more networks, according to at least one exemplary embodiment.

FIG. 11 illustrates an exemplary architecture for features and systems described herein that includes one or more service provider computers and/or a user device connected via one or more networks, according to at least one exemplary embodiment. The devices discussed in FIGS. 1-6, may use one or more components of the computing devices described in FIG. 11 or may represent one or more computing devices described in FIG. 11. In architecture 1100, one or more users 1102 may utilize user computing devices 1104(1)-(N) (collectively, user devices 1104) to access application 1106 (e.g., a web browser or mobile device application), via one or more networks 1108. In some aspects, application 1106 may be hosted, managed and/or provided by a computing resources service or service provider. One or more service provider computers 1110 may provide a native application which is configured to run on user devices 1104 which user(s) 1102 may interact with. Service provider computer(s) 1110 may, in some examples, provide computing resources such as, but not limited to, client entities, low latency data storage, durable data storage, data access, management, virtualization, cloud-based software solutions, electronic content performance management, etc. Service provider computer(s) 1110 may also be operable to provide web hosting, computer application development and/or implementation platforms, combinations of the foregoing or the like to user(s) 1102. Service provider computer(s) 1110, in some examples, may communicate with one or more third party computers 1112.

In some examples, network(s) 1108 may include any one or a combination of many different types of networks, such as cable networks, the Internet, wireless networks, cellular networks and other private and/or public networks. While the illustrated example represents user(s) 1102 accessing application 1106 over network(s) 1108, the described techniques may equally apply in instances where user(s) 1102 interact with service provider computer(s) 1110 via user device(s) 1104 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 1106 may allow user(s) 1102 to interact with service provider computer(s) 1110 such as to access web content (e.g., web pages, music, video, etc.). Service provider computer(s) 1110, perhaps arranged in a cluster of servers or as a server farm, may host application 1106 and/or cloud-based software services. Other server architectures may also be used to host application 1106. Application 1106 may be capable of handling requests from many users 1102 and serving, in response, various item web pages. Application 1106 can provide any type of website that supports user interaction, including social networking sites, online retailers, informational sites, blog sites, search engine sites, news and entertainment sites and so forth. As discussed above, the described techniques can similarly be implemented outside of application 1106, such as with other applications running on user device(s) 1104.

User device(s) 1104 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1104 may be in communication with service provider computer(s) 1110 via network(s) 1108, or via other network connections. Additionally, user device(s) 1104 may be part of the distributed system managed by, controlled by or otherwise part of service provider computer(s) 1110 (e.g., a console device integrated with service provider computers 1110).

In one illustrative configuration, user device(s) 1104 may include at least one memory 1114 and one or more processing units (or processor(s)) 1116. Processor(s) 1116 may be implemented as appropriate in hardware, computer-executable instructions, firmware, or combinations thereof. Computer-executable instruction or firmware implementations of processor(s) 1116 may include computer-executable or machine-executable instructions written in any suitable programming language to perform the various functions described. User device(s) 1104 may also include geo-location devices (e.g., a global positioning system (GPS) device or the like) for providing and/or recording geographic location information associated with user device(s) 1104.

Memory 1114 may store program instructions that are loadable and executable on processor(s) 1116, as well as data generated during the execution of these programs. Depending on the configuration and type of user device(s) 1104, memory 1114 may be volatile (such as random access memory (RAM)) and/or non-volatile (such as read-only memory (ROM), flash memory, etc.). User device(s) 1104 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 1114 may include multiple different types of memory, such as static random access memory (SRAM), dynamic random access memory (DRAM), or ROM.

Turning to the contents of memory 1114 in more detail, memory 1114 may include an operating system and one or more application programs or services for implementing the features disclosed herein including at least a user provided input element or electronic service web page, such as via browser application 1106 or dedicated applications (e.g., smart phone applications, tablet applications, etc.). Browser application 1106 may be configured to receive, store and/or display a website or other interface for interacting with service provider computer(s) 1110. Additionally, memory 1114 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1104.

In some aspects, service provider computer(s) 1110 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 1110 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1110 may be in communication with user device(s) 1104 and/or other service providers via network(s) 1108, or via other network connections. Service provider computer(s) 1110 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 1110 may include at least one memory 1118 and one or more processing units (or processor(s)) 1120. Processor(s) 1120 may be implemented as appropriate in hardware, computer-executable instructions, firmware or combinations thereof. Computer-executable instruction or firmware implementations of processor(s) 1120 may include computer-executable or machine-executable instructions written in any suitable programming language to perform the various functions described.

In some instances, hardware processor(s) 1120 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 1118 may store program instructions that are loadable and executable on processor(s) 1120, as well as data generated during the execution of these programs. Depending on the configuration and type of service provider computer(s) 1110, memory 1118 may be volatile (such as RAM) and/or non-volatile (such as ROM, flash memory, etc.). Service provider computer(s) 1110 or servers may also include additional storage 1122, which may include removable storage and/or non-removable storage. The additional storage 1122 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 1118 may include multiple different types of memory, such as SRAM, DRAM, or ROM.

Memory 1118, the additional storage 1122, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 1118 and the additional storage 1122 are all examples of computer storage media. Additional types of computer storage media that may be present in service provider computer(s) 1110 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1110. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1110 may also contain communications connection(s) 1124 that allow service provider computer(s) 1110 to communicate with a stored database, another computing device or server, user terminals and/or other devices on network(s) 1108. Service provider computer(s) 1110 may also include I/O device(s) 1126, such as a keyboard, a mouse, a pen, a voice input device, a touch input device, a display, speakers, a printer and the like.

Memory 1118 may include an operating system 1128, one or more data stores 1130 and/or one or more application programs or services for implementing the features disclosed herein, including an logging module 1132 and a management process 1140. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 11, and/or functions described herein can be provided by one or more modules that exist as separate modules and/or module functions described herein can be spread over multiple modules.

Figure 12:
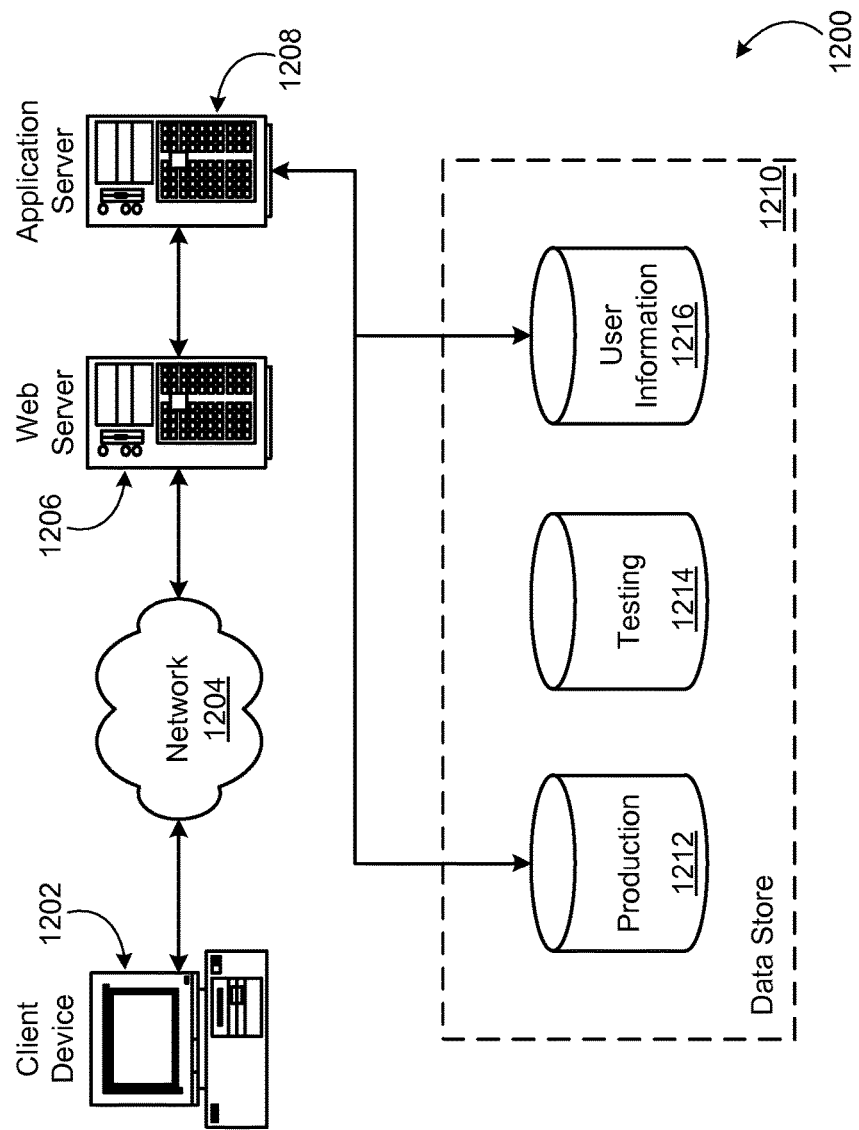
FIG. 12 shows an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a first server computer, a request to migrate a virtual machine running on the first server computer to a second server computer;
copying, by the first server computer, a plurality of memory pages of the virtual machine to the second server computer;
determining, by the first server computer, using an input/output (I/O) logging buffer from a plurality of I/O buffers on an I/O device, that the I/O device has performed a direct memory access (DMA) write operation since the copying of the plurality of memory pages, wherein the I/O logging buffer stores one or more DMA operations performed by the I/O device,
wherein the one or more DMA operations performed by the I/O device are stored in the I/O logging buffer by classifying traffic data elements at the I/O device from a communication channel resulting in the one or more DMA operations, wherein the classifying comprises determining that the traffic data elements are directed to the virtual machine and routing the determined traffic data elements to the I/O logging buffer;
determining, by the first server computer, a modified memory page corresponding to an address of the DMA write operation;
copying, by the first server computer, the modified memory page to the second server computer; and
halting, by the first server computer, the virtual machine, wherein the virtual machine is resumed on the second server computer.

2. The computer-implemented method of claim 1, wherein a hypervisor tracks a plurality of dirty memory pages, wherein a page is marked as dirty if it has been modified since the copying of the plurality of memory pages, and wherein the hypervisor copies the plurality of dirty memory pages to the second server computer.

3. The computer-implemented method of claim 1, further comprising copying, by the first server computer, state corresponding to the I/O logging buffer, wherein the second server computer uses the I/O logging buffer state to replay a plurality of pending I/O requests.

4. The computer-implemented method of claim 3, wherein the I/O device communicates with the virtual machine via a PCI Express bus, and wherein the I/O logging buffer stores transaction layer packets.

5. A computer-implemented method, comprising:
receiving, by a first server computer, a request to migrate a virtual machine running on the first server computer to a second server computer;
copying, by the first server computer, a plurality of memory data of the virtual machine to the second server computer;
determining, by the first server computer, that a subset of the plurality of memory data has been modified by an I/O device during the copying of the plurality of memory data performed by the first server computer,
wherein the determination that the subset of memory has been modified is performed using an I/O logging buffer of a plurality of I/O logging buffers on the I/O device, wherein the I/O logging buffer logs traffic data elements from a communication of the I/O device over a communication channel, and
wherein a classifier module on the I/O device determines the traffic data elements from the communication that are directed to the virtual machine and routes the determined traffic data elements to the I/O logging buffer;
copying, by the first server computer, in response to determining that the subset of the plurality of memory data has been modified, the modified memory data to the second server computer; and
halting, by the first server computer, the virtual machine, wherein the virtual machine is resumed on the second server computer.

6. The method of claim 5, wherein the communication channel is a PCI Express bus, and wherein the I/O logging buffer comprises a plurality of transaction layer packets sent or received by the I/O device.

7. The method of claim 5, wherein the communication channel is a communication network, and wherein the I/O logging buffer comprises a plurality of Ethernet packets.

8. The method of claim 5, wherein the I/O device is one of a plurality of virtual I/O devices running on an offload engine.

9. The method of claim 5, further comprising copying, by the first server computer, state corresponding to the I/O logging buffer, wherein the second server computer uses the I/O logging buffer state to replay a plurality of pending I/O requests.

10. The method of claim 5, wherein determining that the subset of the plurality of memory data has been modified by the I/O device comprises:
determining, by the first server computer, one or more host physical memory addresses written to by the I/O device; and
determining, by the first server computer, a virtual machine physical memory address for the virtual machine corresponding to each of the host physical memory addresses.

11. The method of claim 10, wherein the virtual machine physical memory address corresponding to a host physical memory addresses is determined using a shadow page table.

12. A computing device comprising:
- a processor comprising one or more processing cores, wherein each processing core is configured to execute a respective plurality of virtual machines simultaneously and wherein each virtual machine comprises a respective plurality of computer executable instructions;
- an input/output (I/O) device operable to write data to a main memory of the computing device and comprising:
    - a plurality of I/O logging buffers on the I/O device, wherein an I/O logging buffer from the plurality of I/O logging buffers on the I/O device is configured to log traffic data elements sent via the communication channel, wherein the traffic data elements include direct memory access (DMA) write requests; and
    - a classifier module on the I/O device operable to determine that the traffic data elements from the communication are directed to a virtual machine from the plurality of virtual machines, and further operable to route the determined traffic data elements to the I/O logging buffer.

13. The computing device of claim 12, wherein the processor is configured to migrate the virtual machine in the plurality of virtual machines to a second computing device, wherein migrating the virtual machine comprises:
- copying, by the processor, a plurality of memory data of the virtual machine to the second computing device;
- determining, by the processor, that a subset of the plurality of memory data has been modified by the I/O device using the I/O logging buffer; and
- copying, by the processor, the modified memory data to the second computing device.

14. The computing device of claim 13, wherein the plurality of memory data of the virtual machine comprises a plurality of memory pages and wherein the subset of the plurality of memory data comprises a subset of the memory pages.

15. The computing device of claim 13, wherein the computing device further comprises a shadow page table mapping host physical memory pages to virtual machine physical pages, wherein the shadow page table and the I/O logging buffer are operable to determine a plurality of virtual machine physical pages modified by the I/O device.

16. The computing device of claim 13, wherein the communication channel is a PCI Express bus, and wherein the I/O logging buffer comprises a plurality of transaction layer packets sent or received by the I/O device.

17. The computing device of claim 13, wherein the processor is further configured to copy state corresponding to the I/O logging buffer, wherein the I/O logging buffer state is operable to replay a plurality of pending I/O requests.

18. The computing device of claim 12, wherein the computing device comprises an offload engine, wherein the I/O device is one of a plurality of virtual I/O devices running on the offload engine, and wherein the I/O logging buffer is one of a plurality of I/O logging buffers maintained by the offload engine.

* * * * *

UNITED STATES PATENT AND TRADEMARK OFFICE
CERTIFICATE OF CORRECTION

PATENT NO. : 9,733,980 B1
APPLICATION NO. : 14/562560
DATED : August 15, 2017
INVENTOR(S) : Asif Khan, Anthony Nicholas Liguori and Mark Bradley Davis It is certified that error appears in the above-identified patent and that said Letters Patent is hereby corrected as shown below:

In the Claims

Column 26, Line 21, Claim 5:
Should read: wherein the determination that the subset of the plurality of memory data Column 26, Line 34, Claim 5:
Should read: data has been modified, the modified subset of the plurality of data to Column 27, Line 13, Claim 12:
Delete: "log traffic data elements sent via the communication"
Insert: --log traffic data elements sent via a communication--

Column 27, Line 23, Claim 13:
Delete: "processor is configured to migrate the virtual machine in the"
Insert: --processor is configured to migrate the virtual machine from the--

Column 28, Line 1, Claim 13:
Should read: copying, by the processor, the modified subset of the plurality of memory data to Signed and Sealed this
Twenty-fourth Day of July, 2018

Andrei Iancu
*Director of the United States Patent and Trademark Office*